(12) United States Patent
Ichikawa et al.

(10) Patent No.: US 8,852,517 B2
(45) Date of Patent: Oct. 7, 2014

(54) METHOD FOR PRODUCING ALIPHATIC POLYESTER HAVING INCREASED MOLECULAR WEIGHT

(75) Inventors: Yasushi Ichikawa, Tokyo (JP); Hideharu Kimura, Tokyo (JP); Akira Ishii, Tokyo (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 13/997,364

(22) PCT Filed: Apr. 19, 2011

(86) PCT No.: PCT/JP2011/059604
§ 371 (c)(1),
(2), (4) Date: Jul. 8, 2013

(87) PCT Pub. No.: WO2012/086226
PCT Pub. Date: Jun. 28, 2012

(65) Prior Publication Data
US 2013/0289221 A1 Oct. 31, 2013

(30) Foreign Application Priority Data
Dec. 24, 2010 (JP) ................................ 2010-288729

(51) Int. Cl.
*B01J 19/20* (2006.01)
*C08G 18/42* (2006.01)
*C08G 18/73* (2006.01)
*C08G 18/08* (2006.01)

(52) U.S. Cl.
CPC ............ *C08G 18/4238* (2013.01); *C08G 18/73* (2013.01); *C08G 18/0895* (2013.01)
USPC ..................................... 422/137; 525/440.01

(58) Field of Classification Search
CPC . C08G 18/0895; C08G 18/4238; C08G 18/73
USPC ..................... 525/440.01, 440; 422/131–138, 422/225–229
See application file for complete search history.

(56) References Cited

U.S. PATENT DOCUMENTS

| 5,306,787 A | 4/1994 | Takiyama et al. |
| 6,087,466 A | 7/2000 | Murata et al. |
| 2004/0198942 A1 | 10/2004 | Brauer et al. |

FOREIGN PATENT DOCUMENTS

| CN | 101896533 | 11/2010 |
| EP | 0 519 734 | 12/1992 |
| EP | 565235 A2 * | 10/1993 |
| EP | 0 598 283 | 5/1994 |
| JP | 2825969 | 9/1998 |
| JP | 2004-76013 | 3/2004 |
| WO | 98/44014 | 10/1998 |

OTHER PUBLICATIONS

Office Action issued Apr. 21, 2014 in Chinese Application No. 201180059205.1.
International Search Report issued Aug. 9, 2011 in International (PCT) Application No. PCT/JP2011/059604.

* cited by examiner

*Primary Examiner* — Randy Gulakowski
*Assistant Examiner* — Christopher M Rodd
(74) *Attorney, Agent, or Firm* — Wenderoth, Lind & Ponack, L.L.P.

(57) ABSTRACT

The present invention addresses the problem of providing a method for continuously and effectively producing an aliphatic polyester having an increased molecular weight by preventing evaporation of a diisocyanate when blending the diisocyanate with an aliphatic polyester prepolymer in a molten state at a temperature not lower than the melting point thereof so that the diisocyanate and the aliphatic polyester prepolymer are uniformly blended.

In order to solve the above-mentioned problem, the present invention provides a method for producing an aliphatic polyester having an increased molecular weight comprising the steps of (i) quantitatively injecting a diisocyanate into an aliphatic polyester prepolymer which has a number average molecular weight of 5,000 or higher and has terminal hydroxyl groups and in which at least one acid component is a succinic acid compound, in a melting state at a temperature not lower than the melting point thereof wherein the amount of the diisocyanate is equivalent to between one tenth and two times the amount of hydroxyl groups in the aliphatic polyester prepolymer, (ii) quantitatively and continuously introducing the diisocyanate-containing aliphatic polyester prepolymer obtained at the step (i) into a mixing tank, discharging same from the mixing tank under stirring and supplying it to a coupling reaction tank, and (iii) reacting the aliphatic polyester prepolymer with the diisocyanate in the coupling reaction tank.

10 Claims, 3 Drawing Sheets

METHOD FOR PRODUCING ALIPHATIC POLYESTER HAVING INCREASED MOLECULAR WEIGHT

TECHNICAL FIELD

The present invention relates to a method for continuously and effectively producing an aliphatic polyester having an increased molecular weight. The obtained polyester having an increased molecular weight is a high-quality resin.

BACKGROUND ART

Conventionally, the high molecular weight polyesters used in films, sheets, fibers, and other molded articles were mostly aromatic polyesters such as polyethylene terephthalate and polybutylene terephthalate.

Aliphatic polyesters generally regarded as being biodegradable have attracted attention in recent years from the point of environmental protection and the like. As a method for producing the aliphatic polyesters, a method comprising directly esterifying an aliphatic dicarboxylic acid with an aliphatic diol or a method comprising conducting transesterification of an alkyl ester of aliphatic dicarboxylic acid or an anhydride thereof with an aliphatic diol to obtain a glycol ester or a low polymer thereof and then stirring the same by heat under high vacuum for polycondensation has been known.

Polymerization proceeds by removing a released component outside the system in the polycondensation reaction as above. It is generally conducted by distilling the released component from the system conditioned at a high temperature and under high vacuum. For example, Patent publication 1 discloses a method for producing an aliphatic polyester having an increased molecular weight comprising esterifying an aliphatic dicarboxylic acid with a glycol component and conducting a reaction to remove glycol from the formed polyester diol in the presence of a catalyst at a temperature of 180-230° C. under high vacuum at 0.005-0.1 mmHg.

However, it is not sufficient to put the system under high vacuum, but it is necessary to make the surface area of the reactants for polycondensation sufficiently large and effectively renewed. This is because the released component present on the surface of the reactants can be removed more easily. In particular, as the viscosity of the reactants is increased and it is difficult for the released component to diffuse from the reactants in the latter half of the polycondensation reaction, it is necessary to make the surface area of the reactants larger by mechanical stirring so as to effectively renew the surface. As the desired surface area and effective surface renewal cannot be achieved in using a conventional polymerization apparatus equipped with conventional stirring blades, problems where the reaction does not proceed sufficiently and an aliphatic polyester having an increased molecular weight cannot be obtained occur. Formation of a film or sheet using a polybutylene succinate having a low molecular weight is difficult.

In addition, as there is a limit to the direct polymerization described above, Patent publication 2 proposes preparation of an aliphatic polyester having an increased molecular weight by adding a diisocyanate having an isocyanate group in an amount one tenth to two times equivalent to the amount of the hydroxyl groups to an aliphatic polyester prepolymer substantially having terminal hydroxyl groups in a molten state at a temperature not lower than the melting temperature thereof. It has been known that the aliphatic polyester having an increased molecular weight obtained by this method has a weight average molecular weight (Mw) of 200,000 or higher that cannot be achieved by a conventional direct polymerization method and that formability and physical properties of films thereof are excellent. However, by this method, reduction of accuracy in controlling molecular weight and formation of gelation and fish eyes sometimes occurred when adding the isocyanate to a polymerization tank as in the conventional method.

PRIOR ART REFERENCE

Patent Publications
Patent publication 1: Japanese Patent Laid-Open No. 5-310898
Patent publication 2: Japanese Patent No. 2825969

SUMMARY OF THE INVENTION

Problems to be Solved by the Invention

The inventors of this application have studied the reduction of accuracy in controlling molecular weight and formation of gelation and fish eyes and as a result, they found that when an isocyanate is added to a polymerization tank at a high temperature not lower than the melting point of the aliphatic polyester prepolymer so as to increase the molecular weight, the isocyanate evaporates due to the high temperature and not all of the amount of isocyanate added is used for the reaction and that the evaporated isocyanate is adhered to the inner wall of the reaction tank vapor-phase portion.

Accordingly, the object of the present invention is to provide a method for continuously and effectively producing an aliphatic polyester having an increased molecular weight which prevents evaporation of diisocyanate at the step of mixing the diisocyanate with the aliphatic polyester prepolymer in a molten state at a temperature not lower than the melting point of the prepolymer and enables uniform mixing of the diisocyanate with the aliphatic polyester prepolymer.

Means for Solving the Problems

The inventors of this application keenly studied to achieve the above object, and as a result, found that a high-quality aliphatic polyester having an increased molecular weight in which gelation or formation of fish eyes are reduced can be obtained by quantitatively injecting a diisocyanate into an aliphatic polyester prepolymer in a molten state at a temperature not lower than the melting point thereof, sufficiently stirring and uniformly mixing same, and then subjecting same to a coupling reaction.

Namely, the present invention is:

(1) a method for producing an aliphatic polyester having an increased molecular weight comprising the steps of:

(i) quantitatively injecting a diisocyanate into an aliphatic polyester prepolymer which has a number average molecular weight of 5000 or higher and has terminal hydroxyl groups and in which at least one acid component is a succinic acid compound, in a molten state at a temperature not lower than the melting point thereof, wherein the diisocyanate comprises isocyanate groups in the amount equivalent to between one tenth and two times the amount of the hydroxyl groups in the aliphatic polyester prepolymer, (ii) quantitatively and continuously introducing the diisocyanate-containing aliphatic polyester prepolymer obtained at step (i) into a mixing tank, discharging same from the mixing tank under stirring, and supplying same to a coupling reaction tank, and (iii) reacting the aliphatic polyester prepolymer with the diisocyanate in the coupling reaction tank;

(2) the method for producing an aliphatic polyester having an increased molecular weight according to (1), wherein the mixing tank in (ii) has an inlet of the diisocyanate-containing aliphatic polyester prepolymer in its upper portion, an outlet for discharging a mixture of the aliphatic polyester prepolymer with the diisocyanate in its bottom portion, and at least one partitioning plate and stirring blade;

(3) the method for producing an aliphatic polyester having an increased molecular weight according to (2), wherein said at least one partitioning plate and stirring blade are spaced one above the other;

(4) the method for producing an aliphatic polyester having an increased molecular weight according to (2) or (3), wherein the stirring blade is a multistage blade;

(5) the method for producing an aliphatic polyester having an increased molecular weight according to any one of (1) to (4), wherein the diisocyanate is injected by a non-pulsating pump at step (i) above;

(6) the method for producing an aliphatic polyester having an increased molecular weight according to any one of (1) to (5), wherein the reaction at step (iii) above is conducted under stirring;

(7) the method for producing an aliphatic polyester having an increased molecular weight according to (6), wherein the reaction at step (iii) is conducted under stirring by a helical ribbon blade or a twisted lattice-shape blade;

(8) the method for producing an aliphatic polyester having an increased molecular weight according to any one of (1)-(5), wherein the reaction at step (iii) above is conducted without stirring;

(9) the method for producing an aliphatic polyester having an increased molecular weight according to any one of (1)-(8), wherein at least one polyalcohol component in the aliphatic polyester is ethylene glycol; and (10) the method for producing an aliphatic polyester having an increased molecular weight according to any one of (1)-(8), wherein at least one polyalcohol component in the aliphatic polyester is 1,4-butanediol.

Effect of the Invention

According to the method of the present invention, a high-quality aliphatic polyester having an increased molecular weight with less occurrence of gelation and less formation of fish eyes can be continuously produced in increasing the molecular weight of an aliphatic polyester. In addition, according to the production method of the present invention, accuracy in controlling the melt-flow rate (MFR) of the obtained aliphatic polyester having an increased molecular weight is high.

MODE FOR CARRYING OUT THE INVENTION

The present invention relates to a method for continuously and stably producing an aliphatic polyester having an increased molecular weight on an industrial scale comprising injecting a diisocyanate into an aliphatic polyester prepolymer which has a number average molecular weight of 5000 or higher and has terminal hydroxyl groups and in which at least one acid component is a succinic acid compound, in a molten state at a temperature not lower than the melting point thereof, wherein the diisocyanate comprises isocyanate groups in the amount equivalent to between one tenth and two times the amount of the hydroxyl groups in the aliphatic polyester prepolymer.

The succinic acid compound used in the present invention is succinic acid or a derivative thereof (such as diesters, monoesters, and anhydride thereof). Specific examples thereof include succinic acid; succinic acid esters such as dimethyl succinate and diethyl succinate; and succinic anhydride. Among them, succinic acid, dimethyl succinate, and succinic anhydride are preferable. Succinic acid or derivatives thereof may be used alone or in combination of two or more thereof.

Dicarboxylic acid compounds other than the succinic acid compound may be used as part of the acid components above. Specific examples thereof include dicarboxylic acids having a linear or branched alkylene group such as adipic acid, suberic acid, sebacic acid, azelaic acid, decane dicarboxylic acid, dodecane dicarboxylic acid, octadecane dicarboxylic acid, and dimeric acid; esters of the dicarboxylic acids such as dimethyl adipate and dimethyl malonate; acid anhydrides such as maleic anhydride, itaconic anhydride, and adipic anhydride; and oxycarboxylic acids such as malic acid, tartaric acid, and citric acid. Among them, adipic acid or an adipic acid derivative such as dimethyl adipate is preferable.

The amount of the dicarboxylic acid component other than the succinic acid compound above is about 0-35 mol %, preferably about 0-25 mol %, with respect to the total amount of dicarboxylic acids as the acid components.

Glycol is used as a polyalcohol for producing the aliphatic polyester used in the production method of the present invention. Examples thereof include aliphatic glycols having a linear or branched alkylene group such as ethylene glycol, 1,2-propanediol, 1,3-propanediol, 1,2-butanediol, 1,3-butanediol, 1,4-butanediol, 2,3-butanediol, 1,5-pentanediol, 1,2-pentanediol, 2,4-pentanediol, 1,6-hexanediol, 1,2-hexanediol, neopentyl glycol, and 2,2-diethyl-1,3-propanediol; epoxides corresponding to 1,2-glycol; alcohols having a valency of three or higher such as trimethylolpropane; and diepoxides. Among them, ethylene glycol and 1,4-butanediol are preferable. 1,4-Butanediol is more preferable.

The amount of the glycol component used is different, depending on the physical properties of the desired polyester, but in general, it is 1.02-1.5 mole, preferably 1.03-1.2 mole, with respect to one mole of the dicarboxylic acid component. If it is less than 1.02 mole, the content of the aliphatic polyester prepolymer having terminal hydroxyl groups is small.

In general, an aliphatic polyester is produced in the presence of a catalyst. Catalysts may be used alone or in combination of two or more thereof. A wide range of catalysts used in transesterification reaction can be used. Examples of the catalysts include protonic acids such as sulfuric acid, p-toluenesulfonic acid, and phosphoric acid and derivatives thereof;

metal compounds comprising a metal such as Li, Mg, Ca, Ba, La, Ce, Ti, Zr, Hf, V, Mn, Fe, Co, Ir, Ni, Zn, Ge, and Sn (for example, organic compounds comprising the metal such as organic acid salts, metal alkoxides, and metal complexes (acetylacetonate and the like) and inorganic compounds comprising the metal such as metal oxides, metal hydroxides, carbonates, phosphates, sulfates, nitrates, and chlorides). Among these metal compound catalysts, organic titanium compounds such as titanium compounds, especially titanium tetraethoxide, titanium tetraisopropoxide, and titanium tetrabutoxide are preferable. The amount of these metal compound catalysts is about 0.005-1 mole, preferably about 0.01-0.3 mole, with respect to 100 mole of the total amount of the acid components.

In the method of the present invention, an organic or inorganic phosphorus compound may be used as a catalyst with the metal compound catalyst above (such as an organic titanium compound). A polymer having an increased molecular weight can be obtained in a short polymerization time by using the metal compound above in combination with the organic or inorganic phosphorus compound.

The organic or inorganic phosphorus compound is exemplified as below.

(a) Phosphoric acid and organic esters thereof: commercially available products thereof include phosphoric acid, alkyl or aryl acidic phosphates (in which the alkyl or aryl group is methyl, isopropyl, butyl, octyl, phenyl, and naphthyl group), and the like.

(b) Phosphonic acid and organic esters thereof: commercially available products thereof include methyl phosphonate, ethyl phosphonate, aryl phosphonates such as phenyl phosphonate and naphthyl phosphonate, dibutyl butyl phosphonate, and the like. Substituents such as alkyl groups (C1-4 alkyl groups and the like such as methyl group), halogen atoms (fluorine atom, chlorine atom, and the like), alkoxy groups (C1-4 alkoxy groups and the like such as methoxy group), nitro group, and the like may be bonded to the aromatic rings of the aryl phosphonates above.

(c) Phosphorous acid and organic esters thereof: examples thereof include dibutyl hydrogen phosphite, triphenyl phosphite, diphenyl isodecyl phosphite, and tris isodecyl phosphite.

The amount of the organic or inorganic phosphorus compound in using the metal compound catalyst in combination with the organic or inorganic phosphorus compound as catalysts is 1-100 mole, preferably 5-33 mole, with respect to 100 mole of the metal compound catalyst (such as an organic titanium compound).

The type of diisocyanate used in the present invention is not particularly limited, but a commercially available product per se can be used.

Examples thereof include 2,4-trilene diisocyanate, a mixture of 2,4-trilene diisocyanate and 2,6-trilene diisocyanate, diphenylmethane diisocyanate, P,P'-diphenyl diisocyanate, 1,6-naphthylene diisocyanate, xylylene diisocyanate, hydrogenated xylylene diisocyanate, isophorone diisocyanate, and hexamethylene diisocyanate.

Figure 1:
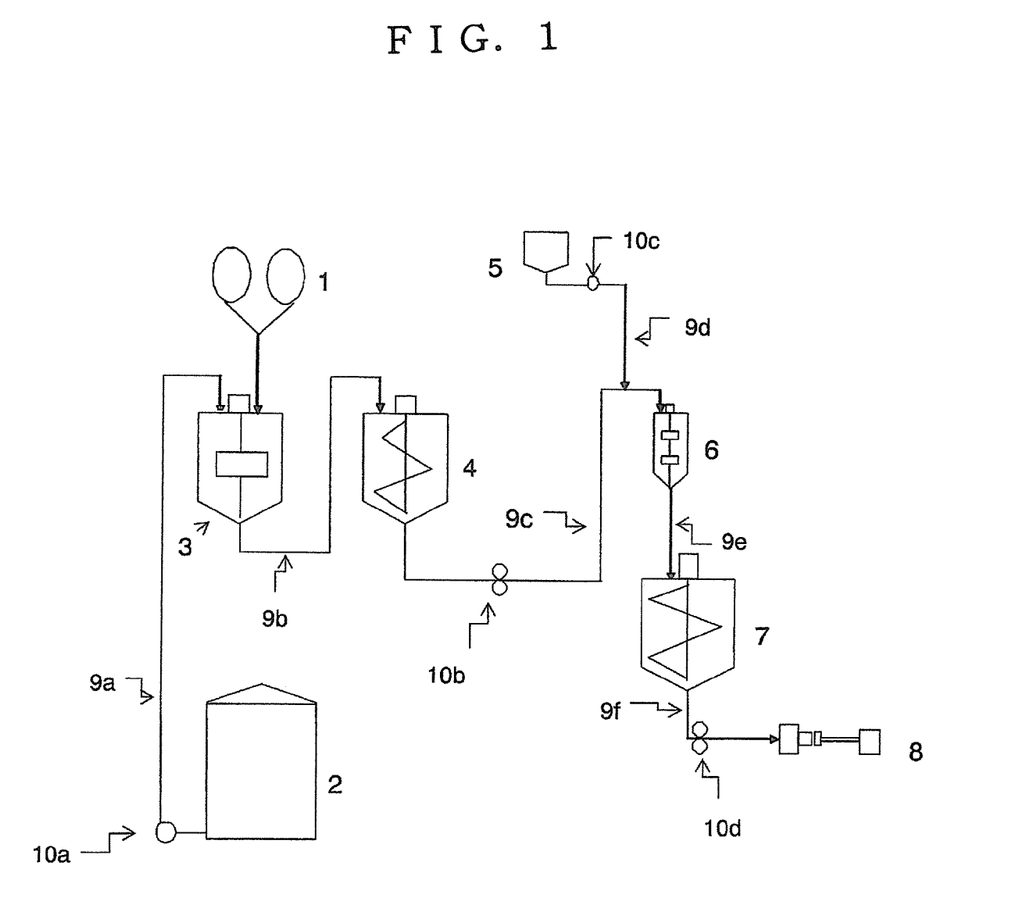
FIG. 1 is a schematic drawing of the production method of the present invention.

Next, embodiments of the present invention will be explained with reference to FIG. 1. FIG. 1 is an example of the scheme of the production method of the present invention.

In the specification of this application, the descriptions, i.e., weighing hopper 1 for supplying the acid component comprising the succinic acid compound to esterification tank 3, glycol storage tank 2 from which the glycol component is supplied to esterification tank 3, esterification tank 3 in which the acid component and the glycol component are mixed and esterified, transesterification reaction tank 4 in which glycol is removed by transesterification reaction from the aliphatic polyester prepolymer formed in the esterification tank 3, diisocyanate storage tank 5, mixing tank 6 in which the aliphatic polyester prepolymer is mixed with the diisocyanate, coupling reaction tank 7 for obtaining the aliphatic polyester having an increased molecular weight in which the mixed aliphatic polyester prepolymer and diisocyanate are reacted, and pelletizer 8 for pelletizing the aliphatic polyester having an increased molecular weight obtained as a final product are used.

Glycol storage tank 2 and esterification tank 3 are connected by pipe 9a. Esterification tank 3 and transesterification reaction tank 4 are connected by pipe 9b. Transesterification reaction tank 4 and mixing tank 6 are connected by pipe 9c. Diisocyanate storage tank 5 is connected to pipe 9c via pipe 9d. Mixing tank 6 and coupling reaction tank 7 are connected by pipe 9e. Coupling reaction tank 7 is connected to pelletizer 8 by pipe 9f.

The acid component comprising the succinic acid compound is supplied from weighing hopper 1 to esterification tank 3. When an acid component other than the succinic acid compound is used, a mixture previously prepared with the succinic acid compound may be supplied from weighing hopper 1 to esterification tank 3 or another weighing hopper 1 may be used to supply the other acid component to esterification tank 3 separately from the succinic acid compound.

A catalyst is added from a tank (not shown) for supplying the catalyst to esterification tank 3. The catalyst used at each step may be added to esterification tank 3 at the same time or a catalyst needed in transesterification reaction tank 4 may be added.

Glycol is supplied through pipe 9a to esterification tank 3. Pipe 9a is provided with pump 10a and a weighing apparatus for weighing the amount of glycol supplied, so that the supply by the pump can be automatically stopped. The pump used herein includes centrifugal pumps, turbine pumps, propeller pumps, and the like.

In addition, the temperature of pipe 9a is set to a temperature not lower than the melting point of glycol so as to prevent crystallization of the glycol. The temperature is different, depending on the kind of glycol, but in general, it is preferably set to 30 to 50° C.

Ingredients are preferably reacted under stirring in esterification tank 3 for promoting the reaction efficiently. Esterification tank 3 is preferably provided with a stirring blade. For example, a vertical stirring tank equipped with a stirring blade having a vertical rotation shaft (such as a paddle blade and a turbine blade) is used.

After the predetermined amounts of the acid component, the glycol component, and the catalyst are supplied to esterification tank 3, esterification reaction is conducted under a nitrogen gas atmosphere. In general, the reaction temperature is from 140 to 250° C., preferably from 145 to 245° C. If the temperature is lower than 140° C., the reaction rate is slow and is not practical. If the temperature is higher than 250° C., the formed polymer may be decomposed. In general, the reaction pressure is normal pressure, but the pressure in the system may be reduced in the latter half of the reaction, for example, to from 5 to 100 mmHg (from 665 to 13300 Pa) so as to shorten the reaction time. The reaction time is not particularly limited, but is generally from 6 to 12 hours.

The aliphatic polyester prepolymer obtained in esterification tank 3 has a number average molecular weight of from about 500 to 5,000.

The aliphatic polyester prepolymer obtained in esterification tank 3 is rapidly delivered to transesterification reaction tank 4 through pipe 9b. A catalyst is added as necessary for conducting the transesterification reaction. At this step, the molecular weight of the formed aliphatic polyester prepolymer is increased mainly by transesterification (condensation reaction by removing glycol) of the aliphatic polyester prepolymers. When the number average molecular weight becomes 5,000 or higher, an aliphatic polyester prepolymer having terminal hydroxyl groups is formed.

The temperature in the transesterification reaction is from 200 to 250° C., preferably from 210 to 240° C. If the polymerization temperature is too low, the reaction time becomes longer and the production efficiency is lowered. If the polymerization temperature is too high, the polymer is colored and decomposed products are easily formed. In order to promote the condensation reaction by removing glycol, the pressure in the system should be reduced. The pressure finally reached at the time of completion of reaction is from 0.1 to 5.0 mmHg (from 13 to 666 Pa) and the reaction time is about 5 to 10 hours.

Although esterification reaction and the transesterification reaction in the present invention are bulk polymerization without using solvents, solvents may be used as necessary.

Polymerization apparatuses generally used in polyester prepolymer production such as esterification tank 3 above and coupling polymerization apparatuses can be used as transesterification tank 4. Examples of these polymerization apparatuses include vertical stirring tanks equipped with a stirring blade having a vertical rotation shaft (such as a double helical ribbon blade and a twisted lattice-shape blade).

The aliphatic polyester prepolymer having a number average molecular weight of 5,000 or higher and having terminal hydroxyl groups is delivered to a mixing tank through pipe 9c. The number average molecular weight of the aliphatic polyester prepolymer generally obtained by transesterification reaction is from 5000 to 30,000, preferably from 10,000 to 20,000.

As the viscosity of the aliphatic polyester prepolymer is high, it is necessary to raise the temperature to turn it into a molten state in mixing the aliphatic polyester prepolymer with the diisocyanate. However, if the aliphatic polyester prepolymer in a molten state is simply mixed with the diisocyanate, the diisocyanate evaporates to move to the head space of the mixing tank and cannot be mixed uniformly at the predetermined ratio. In addition, diisocyanate adheres to the inner wall surface of the mixing tank vapor-phase portion, and does not contribute to the reaction, so a prepolymer having a sufficiently increased molecular weight cannot be obtained.

For that reason, evaporation of the diisocyanate can be prevented by using a pump and quantitatively injecting the diisocyanate without generating vapor-phase diisocyanate directly into the aliphatic polyester prepolymer through an inlet provided in pipe 9c which enables injection of the diisocyanate.

Pipe 9c is provided with pump 10b. This pump is provided for delivering the high-temperature aliphatic polyester prepolymer having a high viscosity and needs to be a quantitative pump which can deliver the prepolymer quantitatively and continuously through pipe 9c. The quantitative pump used herein is preferably a volume pump, a rotating pump that can be used for the prepolymer having a high viscosity. Specific examples of the rotating pump include gear pumps, screw pumps, and vane pumps. Among them, gear pumps which have high quantitativity quality and are the most suitable for delivering a fluid having a high viscosity are preferable.

In order to increase the quantitativity, the quantitative pump is driven by a servomotor, whereby the flow rate can be controlled.

The delivery rate of the aliphatic polyester prepolymer through pipe 9c is affected by the scale of the apparatus, the diameter of pipe 9c and the like, but generally is maintained to be constant by which the average residence time in the mixing tank at the following step becomes from 2 to 10 minutes. If the delivery rate is faster than the above, the diisocyanate may not be sufficiently mixed with the aliphatic polyester prepolymer. If it is too slow, the reaction proceeds excessively to increase the viscosity of the polymer, which cannot be easily discharged from the mixing tank.

The rate is adjusted mainly by the rotational speed of the pump (10b).

The aliphatic polyester prepolymer in a molten state is delivered in such a manner that it is filled in pipe 9c. Namely, pipe 9c is filled with the aliphatic polyester prepolymer such that there are few voids in the pipe. The void ratio in pipe 9c is less than 5%, preferably less than 2%, more preferably less than 1%. It is preferable that the diisocyanate is injected into the aliphatic polyester prepolymer without contacting the void portion (vapor phase) in pipe 9c. If the void ratio is large, the diisocyanate injected from pipe 9d evaporates and remains in the void space, whereby the diisocyanate cannot be efficiently mixed with the aliphatic polyester prepolymer at the following step.

Diisocyanate storage tank 5 is connected to the inlet provided in pipe 9c via pipe 9d. Pipe 9d is provided with quantitative pump 10c, which enables a quantitative and continuous supply of the diisocyanate to the aliphatic polyester prepolymer. The quantitative pump used is preferably a non-pulsating pump. In this case, a reciprocating pump suitable for delivering a small amount of a fluid having a low viscosity is preferably used. Examples thereof include diaphragm pumps, piston pumps, and plunger pumps. It is preferable to use plunger pumps connected in line so as to stabilize the flow rate and increase the accuracy. In order to further increase the quantitativity, the quantitative pump may be driven by a servomotor to control the flow rate.

The non-pulsating pump used herein means a pump comprising a plurality of pumps in line whose total volume is constant, namely which can pump flow volumes without pulsation. One is used in a wide range of applications.

The diisocyanate comprising isocyanate groups in an amount equivalent to one tenth to two times the amount of the hydroxyl groups of the aliphatic polyester prepolymer is quantitatively injected. A pump is used to pressurize the diisocyanate in pipe 9d at from 0.5 to 1 MPa at room temperature.

The injected diisocyanate-containing aliphatic polyester prepolymer is quantitatively and continuously supplied from the inlet of mixing tank 6 through pipe 9c.

A vertical mixing apparatus is used as mixing tank 6, and is equipped with a stirring blade mounted on a stirring shaft. Examples of the stirring blade include propeller blades, paddle blades, turbine blades, ribbon blades, special paddle blades, and the like. Two or more mixing apparatuses may be used in combination.

Figure 3:
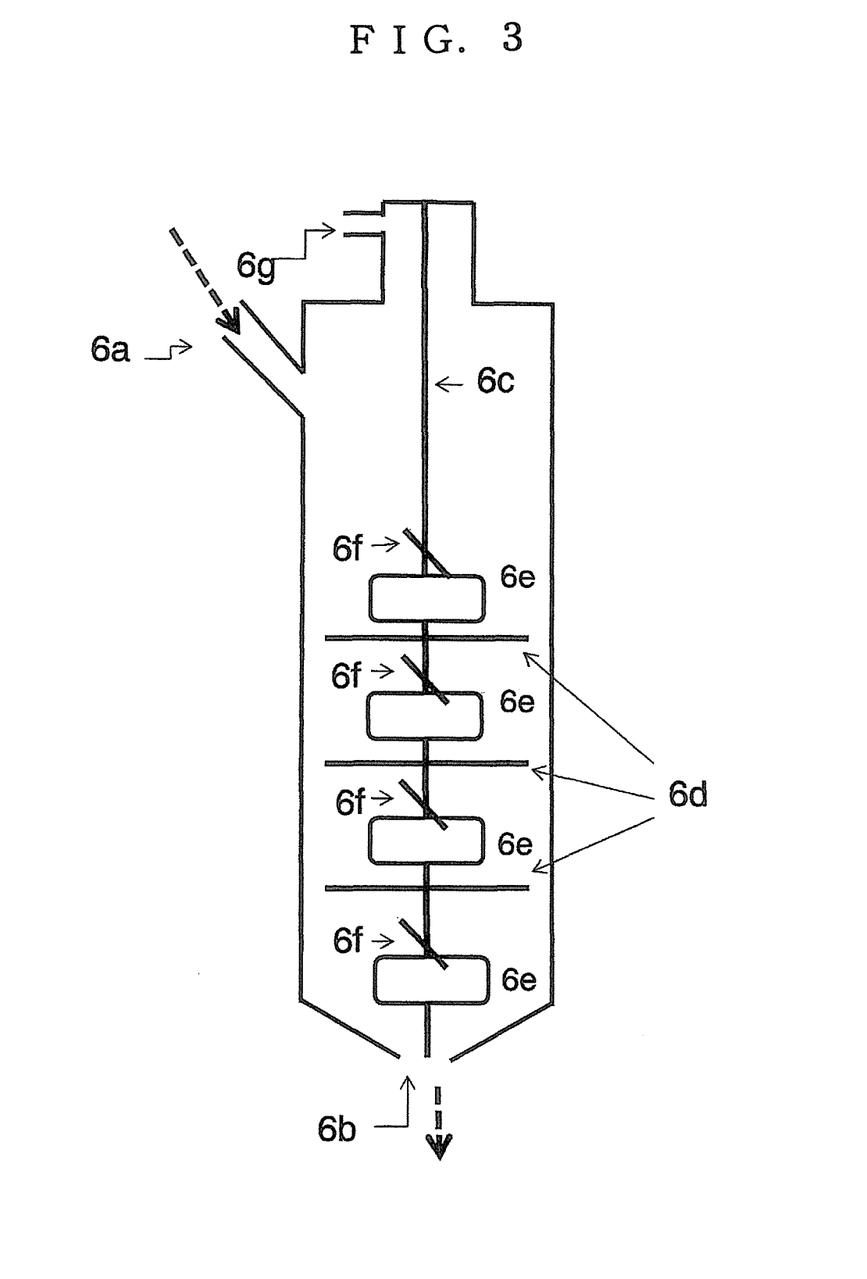
FIG. 3 is an embodiment of mixing tank 6 used in the present invention

Further, one embodiment of mixing tank 6 will be explained with reference to FIG. 3. Mixing tank 6 in FIG. 3 is provided with inlet 6a for ingredients in the upper portion, outlet 6b of the mixture in the bottom portion, stirring shaft 6c, partitioning plate 6d, stirring blades 6e and 6f, and nitrogen inlet 6g.

Inlet 6a is connected to pipe 9c. The injected diisocyanate-containing aliphatic polyester prepolymer is introduced from inlet 6a as shown by a dashed arrow. The introduced ingredient is a fluid having a high viscosity. It is delivered to the bottom portion under stirring. It is important to uniformly mix the ingredients so as to obtain a high-quality aliphatic polyester having an increased molecular weight. Therefore, partitioning plate 6d is provided to maintain an appropriate residence time so as to achieve sufficient stirring by the stirring blades. (Partitioning plate) 6d is fixed to (stirring shaft) 6c.

Stirring blades are provided above and below partitioning plate 6d, 6e and 6f represent stirring blades in FIG. 3. Stirring blade 6e is a stirring blade arranged at an angle of 90° to the horizontal surface. 6f represents a stirring blade arranged at an angle of 45° or 135° to the horizontal surface. One or more stirring blades can be provided. It is preferable to use multi-stage blades as shown in FIG. 3 because efficient stirring can be realized.

It is important that the diisocyanate and the aliphatic polyester prepolymer are delivered at a constant rate in mixing tank 6.

Although the retention time is different, depending on the scale of mixing tank 6 and the like, in general, the introduced ingredients are retained in mixing tank 6 for from 2 to 10 minutes and are discharged from mixing tank 6.

Nitrogen introduced from nitrogen inlet 6g is used for promoting discharge of the polymerization product in the mixing tank. The pressurized level using nitrogen is adjusted to from 0.05 to 0.4 MPa, preferably from 0.1 to 0.3 MPa (namely, the pressure in the mixing tank is adjusted to from 0.15 to 0.5 MPa, preferably from 0.2 to 0.4 MPa.) The blade rotational speed is adjusted to from 50 to 200 rpm.

The mixture uniformly blended in mixing tank 6 is delivered to coupling reaction tank 7 through pipe 9e. A polymerization apparatus that may be used in transesterification reaction tank 4 or a high viscosity polymerization apparatus may be used as the coupling reaction tank. Examples of these polymerization apparatuses include vertical stirring tanks equipped with a stirring blade having a vertical rotation shaft (such as a double helical ribbon blade and a twisted lattice-shape blade). Ingredients can be reacted without stirring in coupling reaction tank 7. In that case, the stirring blades in the stirring tank are not rotated or a reaction tank without stirring blades may be used.

The reaction temperature in coupling reaction tank 7 is from 130 to 210° C., preferably from 160 to 200° C. If the reaction temperature is too low, as the prepolymer crystallizes and is not fluid, stirring cannot be achieved. If the temperature is too high, as the reaction rate becomes too fast, sufficient stirring cannot be achieved. At this step, in general, reaction is carried out for from 2 to 10 hours, preferably from 3 to 8 hours under conditions at normal pressure and at a temperature within the above range.

Nucleators, pigments, dyes, heat stabilizers, antioxidants, weather resistant agents, lubricants, antistatic agents, fillers, reinforcing agents, flame retardants, plasticizers, other polymers, and the like may be added after completion of the reaction, as necessary.

The aliphatic polyester having an increased molecular weight produced by the above method is delivered to pelletizer 8 through pipe 9f, where it is cut into a desired shape (for example, pellets).

As the aliphatic polyester having an increased molecular weight has a high viscosity, pipe 9f is equipped with pump 10d. A pump similar to pump 10b may be used as pump 10d.

The aliphatic polyesters having an increased molecular weight obtained by the production method of the present invention can be formed into films, sheets, fibers, foam bodies, and other molded articles by conventional molding methods such as mold injection, hollow molding, extrusion, and the like. In addition, as the aliphatic polyesters having an increased molecular weight obtained by the production method of the present invention are biodegradable, they are suitably used in garbage bags, agricultural films, cosmetic containers, detergents, and the like, fishing lines, fishnets, ropes, suture threads, food wrapping materials, medical containers, and the like.

EXAMPLES

The present invention will be explained in more detail below with reference to examples, but it is not limited thereto.

Molecular weight determination is carried out by the GPC analysis below.

Shodex GPC SYSTEM-11 (manufactured by SHOWA DENKO K.K.)
Eluent: $CF_3COONa$ 5 mM/HFIP (hexafluoroisopropanol)
Sample column: HFIP-800P and HFIP-80M×two sets
Reference column: HFIP-800R×two sets
Polymer solution: 0.1 wt % HFIP sol., 200 μl
Column temperature: 40° C., flow rate: 1.0 ml/min, pressure: 30 kg/cm$^2$
Detector: Shodex RI
Molecular weight standard: PMMA (Shodex STANFARD M-75)

MFR (melt flow rate) determination was carried out, in accordance with JIS-K-7210, at a temperature of 190° C. under the load of 2.16 kg.

Gel and FE (gelation and fish eyes) were determined by the following steps. A film having a thickness of 30 μm was formed by inflation molding at a molding temperature of 180° C. The film was cut into 50 cm×50 cm squares. Any Gel and/or FE (with a size of 0.2 mm or larger) in a 30 cm×30 cm center space of the cut film were counted visually. Ten Gel and FE portion with a size of from 0.2 to 0.5 mm were evaluated as one Gel and FE portion with a size of 0.5 mm or larger. Samples were evaluated to be assigned with any of five grades determined based on the inequalities below.

$$Ns=(N \times 25)/T$$

T: film thickness (μm), N: total number of Gel and FE portion with a size of 0.5 mm or larger
Evaluation 1: $Ns \leq 1$
2: $1 Ns \leq 3$
3: $3 Ns \leq 10$
4: $10 Ns \leq 20$
5: $20 \leq Ns$ Regarding the determination of foreign substances, substances (such as black spots) in 200 g of resin pellets were confirmed visually and were evaluated to be assigned with any of grades A to E, depending on the size and number thereof.

A: 10 or less foreign substances with a size of 0.1 mm or less, 5 or less foreign substances with a size of more than 0.1 and less than 0.5 mm, 1 or less foreign substances with a size of 0.5 mm or more B: 20 or less foreign substances with a size of 0.1 mm or less, 10 or less foreign substances with a size of more than 0.1 and less than 0.5 mm, 2 or less substances with a size of 0.5 mm or more C: 30 or less foreign substances with a size of 0.1 mm or less, 20 or less foreign substances with a size of more than 0.1 and less than 0.5 mm, 3 or less foreign substances with a size of 0.5 mm or more D: 31 or more foreign substances with a size of 0.1 mm or less, 50 or less foreign substances with a size of more than 0.1 and less than 0.5 mm, 3 or less foreign substances with a size of 0.5 mm or more E: 31 or more foreign substances with a size of 0.1 mm or less, 51 or more foreign substances with a size of more than 0.1 and less than 0.5 mm, 4 or more foreign substances with a size of 0.5 mm or more Example 1

An aliphatic polyester was produced, in accordance with the production flow chart shown in FIG. 1.
(Esterification Reaction)

All the ingredients, i.e., 3589 kg of 1,4-butanediol (39.8× $10^3$ mol: glycol excess ratio of 104.4%) supplied from glycol storage tank 2 using a centrifugal pump, 4500 kg of succinic acid (38.1×$10^3$ mol) from weighing hopper 1, and 810 g of titanium tetraisopropoxide from a catalyst supply tank were charged into a vertical stirring tank with a jacket equipped with paddle blades (esterification tank 3) under a nitrogen atmosphere. The ingredients were stirred at a temperature of 145 to 225° C. at normal pressure for carrying out the esterification reaction. Water formed in the esterification reaction was distilled. When the amount of distilled water was greater than 1390 kg, the pressure in the tank was reduced to 60 mmHg (8000 Pa) and then was maintained for one hour to complete the esterification reaction. The reactant solution was delivered to a vertical stirring tank with a jacket equipped with ribbon blades (transesterification reaction tank 4). The delivered reactant solution was stirred at a temperature of 225 to 240° C. The pressure in the tank was finally reduced to 2 mmHg (267 Pa). After 10 hours, cooling was started. Reduction in pressure was stopped when the temperature reached 190° C. and the inside of the tank was put under a nitrogen atmosphere. Then, 3.28 kg of IRGANOX 1010 (manufactured by BASF: hindered phenol-based antioxidant) was added, the ingredients were cooled to 180° C., and 1.05 kg of phosphorous acid was added to conduct glycol removal reaction (transesterification reaction). The average molecular weight of the product determined by GPC analysis was 10,600.
(Coupling Reaction Step)

The aliphatic polyester prepolymer obtained in the transesterification reaction step above was delivered into mixing tank 6 at a constant flow rate (3250 kg/h) (total amount of 6500 kg) by which the residence time of the solution in the mixing tank became 3 minutes, by a gear pump (pump 10b) at a temperature of 180° C. Pipe 9c was filled with the aliphatic polyester prepolymer and there were no voids in the pipe. Hexamethylene diisocyanate was injected into the pipe at a flow rate of 35.15 kg/h (OH/NCO=1/0.68: total amount of 70.3 kg) by a non-pulsating pump (pump 10c) to be delivered to mixing tank 6. Mixing tank 6 was equipped with three partitioning plates and four stirring blades. The rotational speed of the stirring blades was 100 rpm. The ingredients were agitated and stirred in mixing tank 6 and were delivered into coupling reaction tank 7. The coupling reaction by mixing was further conducted for 7 hours at 180° C. under stirring with helical ribbon blades as long as the blades could rotate.

After completion of the reaction, the resultant product was delivered into an extruder by a gear pump and pelletized by a pelletizer 8 to obtain pellets of an aliphatic polyester having an increased molecular weight.

MFR, Gel, and FE values obtained after a series of polymerization steps was repeated ten times without disassembling and cleaning of the reaction apparatus are shown in Table 1.

Example 2

Pellets of an aliphatic polyester having an increased molecular weight were obtained in the same manner as in Example 1 except that coupling reaction tank 7 without stirring blades was used and the reaction in the reaction tank was conducted without stirring.

Comparative Example 1

Figure 2:
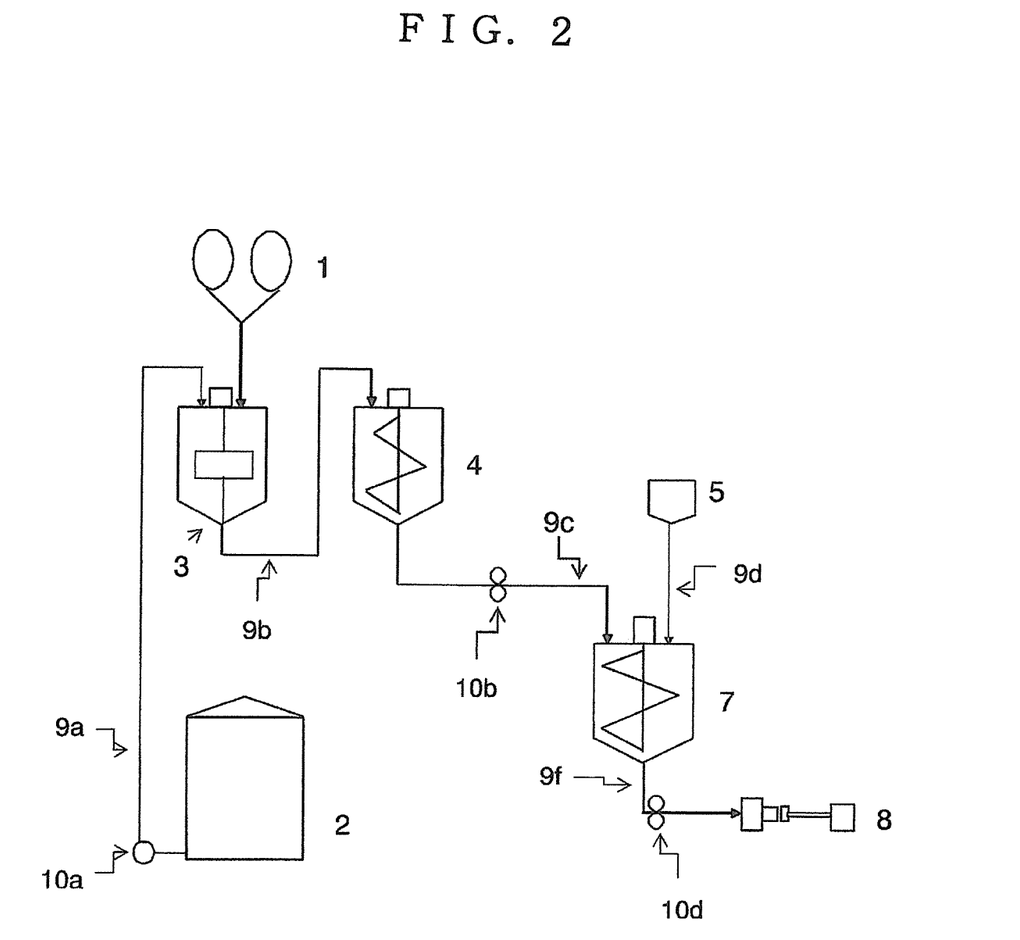
FIG. 2 is a schematic drawing of the production method corresponding to a comparative example.

A summary of the production steps of Comparative example 1 is shown in FIG. 2. Steps before the transesterification reaction were the same as in Example 1. In Comparative example 1, there was no mixing tank 6 and diisocyanate storage tank 5 was directly connected to coupling reaction tank 7 via pipe 9d.

In Comparative example 1, the esterification reaction step and the transesterification reaction were completed as in Example 1. The obtained aliphatic polyester prepolymer was delivered into coupling reaction tank 7 (delivery rate: 3,000 kg/hr, total amount: 6500 kg) in accordance with the flow shown in FIG. 2. After completion of delivery, the predetermined amount (70.3 kg) of hexamethylene diisocyanate was injected from the upper portion (vapor phase) of the coupling tank. The ingredients were agitated and stirred by helical ribbon blades, were maintained at 180° C. for 8 hours, and then were pelletized by pelletizer 8 to obtain an aliphatic polyester having an increased molecular weight.

The diisocyanate measured was charged into diisocyanate storage tank 5 and was delivered while being pressurized with nitrogen. (As it could be delivered by adjusting the pressure of nitrogen, the diisocyanate could be quantitatively delivered without using a pump.)

MFR, Gelation, and FE values obtained after a series of the polymerization steps was repeated ten times are shown in Table 1.

TABLE 1

| | Example 1 | | | Example 2 | | | Comparative example 1 | | |
|---|---|---|---|---|---|---|---|---|---|
| Batch No. | MFR (g/10 min) | Gel. FE | Foreign substances | MFR (g/10 min) | Gel. FE | Foreign substances | MFR (g/10 min) | Gel. FE | Foreign substances |
| 1 | 1.3 | 1 | A | 1.2 | 1 | A | 3 | 1 | A |
| 2 | 0.8 | 1 | A | 1.4 | 1 | A | 2.2 | 1 | A |
| 3 | 1.1 | 1 | A | 0.7 | 1 | A | 2.8 | 1 | A |
| 4 | 1.5 | 1 | A | 1.3 | 1 | A | −0.5 | 2 | B |
| 5 | 0.7 | 2 | B | 0.9 | 1 | A | 1.8 | 2 | A |
| 6 | 0.9 | 1 | A | 1.4 | 1 | A | 2.5 | 3 | C |
| 7 | 1.4 | 1 | A | 1 | 1 | A | 2.8 | 5 | C |
| 8 | 1 | 2 | A | 1.2 | 1 | A | 1.6 | 5 | D |
| 9 | 0.8 | 1 | B | 0.8 | 1 | A | 3.1 | 5 | C |
| 10 | 1.3 | 1 | A | 1.5 | 2 | B | 1.9 | 5 | D |

The desired value of MFR is 1 g/10 min. The level of distribution of values was less and the average value of 10 batches was relatively close to the desired value in the examples, while the level of distribution was significant and the average value was remarkably different from the desired value in the Comparative example. Further, there is a tendency for the evaluation grades on Gel, FE, and foreign substance to become poorer as the batch number increased. This indicates that it was difficult to maintain the quality of the polymer when produced continuously.

EXPLANATION OF SYMBOLS

1: Weighing hopper; 2: glycol storage tank, 3: esterification tank, 4: transesterification reaction tank, 5: diisocyanate storage tank, 6: mixing tank, 6a: inlet, 6b: outlet, 6c: stirring shaft, 6d: partitioning plate, 6e and 6f: stirring blades, 6g: nitrogen inlet, 7: coupling reaction tank, 8: pelletizer, 9a-f: pipes, 10a-d: pumps

The invention claimed is:

1. A method for producing an aliphatic polyester having an increased molecular weight comprising the steps of:
    (i) quantitatively injecting a diisocyanate into an aliphatic polyester prepolymer which has a number average molecular weight of 5000 or higher and has terminal hydroxyl groups and in which at least one acid component is a succinic acid compound, in a molten state at a temperature not lower than the melting point thereof, wherein
    the diisocyanate comprises isocyanate groups in the amount equivalent to between one tenth and two times the amount of the hydroxyl groups in the aliphatic polyester prepolymer,
    (ii) quantitatively and continuously introducing the diisocyanate-containing aliphatic polyester prepolymer obtained at step (i) into a mixing tank, discharging same from the mixing tank under stirring, and supplying same to a coupling reaction tank, and
    (iii) reacting the aliphatic polyester prepolymer with the diisocyanate in the coupling reaction tank.

2. The method for producing an aliphatic polyester having an increased molecular weight according to claim 1,
    wherein the mixing tank in (ii) has an inlet of the diisocyanate-containing aliphatic polyester prepolymer in its upper portion, an outlet for discharging a mixture of the aliphatic polyester prepolymer with the diisocyanate in its bottom portion, and at least one partitioning plate and stirring blade.

3. The method for producing an aliphatic polyester having an increased molecular weight according to claim 2,
    wherein said at least one partitioning plate and stirring blade are spaced one above the other.

4. The method for producing an aliphatic polyester having an increased molecular weight according to claim 2,
    wherein the stirring blade is a multistage blade.

5. The method for producing an aliphatic polyester having an increased molecular weight according to claim 1,
    wherein the diisocyanate is injected by a non-pulsating pump at step (i) above.

6. The method for producing an aliphatic polyester having an increased molecular weight according to claim 1,
    wherein the reaction at step (iii) above is conducted under stirring.

7. The method for producing an aliphatic polyester having an increased molecular weight according to claim 6,
    wherein the reaction at step (iii) is conducted under stirring by a helical ribbon blade or a twisted lattice-shape blade.

8. The method for producing an aliphatic polyester having an increased molecular weight according to claim 1,
    wherein the reaction at step (iii) above is conducted without stirring.

9. The method for producing an aliphatic polyester having an increased molecular weight according to claim 1,
    wherein at least one polyalcohol component in the aliphatic polyester is ethylene glycol.

10. The method for producing an aliphatic polyester having an increased molecular weight according to claim 1,
    wherein at least one polyalcohol component in the aliphatic polyester is 1,4-butanediol.

* * * * *